(12) United States Patent
Tsukamoto et al.

(10) Patent No.: US 10,730,567 B2
(45) Date of Patent: Aug. 4, 2020

(54) REAR VEHICLE-BODY STRUCTURE

(71) Applicant: MAZDA MOTOR CORPORATION, Hiroshima (JP)

(72) Inventors: Hideyuki Tsukamoto, Hiroshima (JP); Ken Yamada, Hatsukaichi (JP); Akiyoshi Masuda, Aki-gun (JP); Hidenori Matsuoka, Hiroshima (JP); Koji Matsushita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1 day.

(21) Appl. No.: 16/296,041

(22) Filed: Mar. 7, 2019

(65) Prior Publication Data
US 2019/0291788 A1 Sep. 26, 2019

(30) Foreign Application Priority Data

Mar. 20, 2018 (JP) ................................. 2018-053189

(51) Int. Cl.
| | | |
|---|---|---|
| *B62D 25/20* | (2006.01) | |
| *B62D 21/02* | (2006.01) | |
| *B60G 13/00* | (2006.01) | |
| *B62D 21/15* | (2006.01) | |

(52) U.S. Cl.
CPC ....... *B62D 25/2027* (2013.01); *B60G 13/003* (2013.01); *B62D 21/02* (2013.01); *B62D 21/152* (2013.01)

(58) Field of Classification Search
CPC ... B62D 25/2027; B62D 21/02; B62D 21/152

USPC ....................... 296/203.04, 193.08
See application file for complete search history.

(56) References Cited

U.S. PATENT DOCUMENTS

| | | | | |
|---|---|---|---|---|
| 6,443,518 B1* | 9/2002 | Rohl | .................... | B62D 25/082 296/187.12 |
| 7,635,158 B2* | 12/2009 | Park | ...................... | B62D 25/20 296/193.07 |
| 2008/0277970 A1* | 11/2008 | Egawa | .................. | B62D 25/087 296/203.04 |
| 2012/0169089 A1* | 7/2012 | Rawlinson | ......... | B62D 25/2027 296/193.08 |

FOREIGN PATENT DOCUMENTS

JP 2003-137140 A 5/2003

* cited by examiner

*Primary Examiner* — Joseph D. Pape
(74) *Attorney, Agent, or Firm* — Studebaker & Brackett PC

(57) ABSTRACT

A recessed portion is formed at a frame member provided at a rear portion of a vehicle body and having a closed cross section extending in a vehicle longitudinal direction such that a part of a lower face of the frame member is recessed upwardly, where a damper of a rear suspension is inserted and fixed. Closed cross sections are formed at a position corresponding to the recessed portion, in a longitudinal direction, of the frame member. The closed cross sections are configured to branch off from the closed cross section inwardly and outwardly in the vehicle width direction relative to the damper. A ridgeline extending in the vehicle longitudinal direction is formed at least at a portion of the frame member which is positioned in front of the recessed portion.

6 Claims, 12 Drawing Sheets

REAR VEHICLE-BODY STRUCTURE

BACKGROUND OF THE INVENTION

The present invention relates to a rear vehicle-body structure which comprises a damper support portion to support a rear suspension damper and a frame member extending in a vehicle longitudinal direction, such as a rear side frame, wherein the frame member is configured to serve as the damper support portion.

As exemplified by Japanese Patent Laid-Open Publication No. 2003-137140, a rear vehicle-body structure in which a damper support portion (a suspension attachment portion (33)) to support a rear suspension damper (hereafter, referred to as a "damper") is provided at a position located on an outward side, in a vehicle width direction, of a frame member (a rear side frame (7)) and on an inward side, in the vehicle width direction, of a wheel house inner (19) is known.

Herein, differently from the above-described structure of the patent document where the frame member, the damper support portion, and the wheel house inner are arranged along the vehicle width direction, it may be considered that a recessed portion 150 is formed at a frame member 160, wherein the recessed portion 150 is configured such that a lower face of the frame member 160 is recessed upwardly, and a damper (not illustrated) is inserted, from below, into and supported at a damper insertion hole 151 which is formed at a recessed bottom of the recessed portion 150, similarly to a rear vehicle-body structure 100 illustrated in FIG. 11.

In this case, however, outward-side and inward-side closed cross sections 160*sa*, 160*sb* are formed at a longitudinal position of the frame member 160 which corresponds to the recessed portion 150, wherein the closed cross sections 160*sa*, 160*sb* are configured to branch off from a closed cross section of the frame member 460 outwardly and inwardly, in the vehicle width direction, relative to the damper as shown in FIG. 12, a sectional view taken along line D-D of FIG. 11. Therefore, the branch-shaped closed cross sections have a smaller total area than the other portion of the frame member which does not correspond to the recessed portion 150, so that it is difficult to secure the modulus of section. In particular, when a rear-collision load is transmitted forwardly from a rear side of the frame member in a case where an obstacle collides with a vehicle rear portion (in a rear collision), it is required that the rear-collision load does not concentrate on the portion of the frame member 160 which corresponds to the recessed portion having the small modulus of section.

SUMMARY OF THE INVENTION

The present invention has been devised in view of the above-described matter, and an object of the present invention is to provide a rear vehicle-body structure which can make the frame member, including the portion corresponding to the recessed portion, properly serve as a load path of the rear-collision load transmitted forwardly from the vehicle rear portion in the rear collision even if the portion of the frame member which corresponds to the recessed portion in the vehicle longitudinal direction has the small modulus of section because the recessed portion to support the damper is provided at the frame member.

The present invention is a rear vehicle-body structure, comprising a frame member provided at a rear portion of a vehicle body and having a closed cross section extending in a vehicle longitudinal direction, a recessed portion formed at the frame member, wherein the recessed portion is configured such that a central part, in a vehicle width direction, of a lower face of the frame member is recessed upwardly, and a damper of a rear suspension is inserted into and fixed to the recessed portion, and inward-side and outward-side closed cross sections formed inside the frame member at a longitudinal position corresponding to the recessed portion, wherein the inward-side and outward-side closed cross sections are configured to branch off from the closed cross section of the frame member inwardly and outwardly in the vehicle width direction relative to the damper, wherein a ridgeline which extends in the vehicle longitudinal direction is formed at least at a portion of the frame member which is positioned in front of the recessed portion.

According to the present invention, the rigidity of the frame member can be increased by forming the ridgeline extending in the vehicle longitudinal direction at least at the portion of the frame member which is positioned in front of the recessed portion, the rear-collision load can be properly transmitted forwardly from the recessed-portion corresponding position, in the vehicle longitudinal direction, of the frame member (from the branch portion of the closed cross section of the frame member) in the rear collision.

In an embodiment of the present invention, the ridgeline is formed such that a step portion where an outward-side portion, in the vehicle width direction, of the lower face of the frame member is located at a higher level than an inward-side portion, in the vehicle width direction, of the lower face of the frame member is provided at a corner portion of an outward-side lower portion of the frame member.

According to this embodiment, a fuel pipe or a breather pipe, for example, can be provided in a space which is formed by the step portion, so that the layout performance (arranging performance) of the fuel pipe or the breather pipe can be improved by using the step portion which is provided by forming the ridgeline.

In another embodiment of the present invention, the ridgeline extends forwardly from a front lower end of the recessed portion of the frame member (in other words, from a front end of a lower opening of the recessed portion).

According to this embodiment, compared to a case where the ridgeline extends forwardly from a position which is spaced forwardly apart from the front lower end of the recessed portion, for example, the rear-collision load can be efficiently transmitted forwardly from the recessed-portion corresponding position, in the vehicle longitudinal direction, of the frame member (the branch portion of the closed cross section) in the vehicle rear collision.

Moreover, according to this embodiment, since a step face is formed at the front lower end of the recessed portion by forming the ridgeline at the front lower end of the recessed portion of the frame member, the rigidity of a position of the frame member which corresponds to the front lower end of the recessed portion in the vehicle longitudinal direction, in particular, can be increased. Accordingly, the damper support rigidity (bending rigidity) of the recessed portion as the damper support portion can be increased.

In another embodiment of the present invention, a front portion of the ridgeline extends forwardly and outwardly in the vehicle width direction, and a front end of the ridgeline joins an outward edge portion, in the vehicle width direction, of the frame member.

According to this embodiment, since the front portion of the ridgeline joins the outward edge portion, in the vehicle width direction, of the frame member, there is no need of making the ridgeline unnecessarily long, and also the rear-collision load can be efficiently transmitted forwardly by using the outward edge portion, in the vehicle width direction, of the frame member which is continuous from the front end of the ridgeline.

Other features, aspects, and advantages of the present invention will become apparent from the following description which refers to the accompanying drawings.

DETAILED DESCRIPTION OF THE INVENTION

Figure 1:
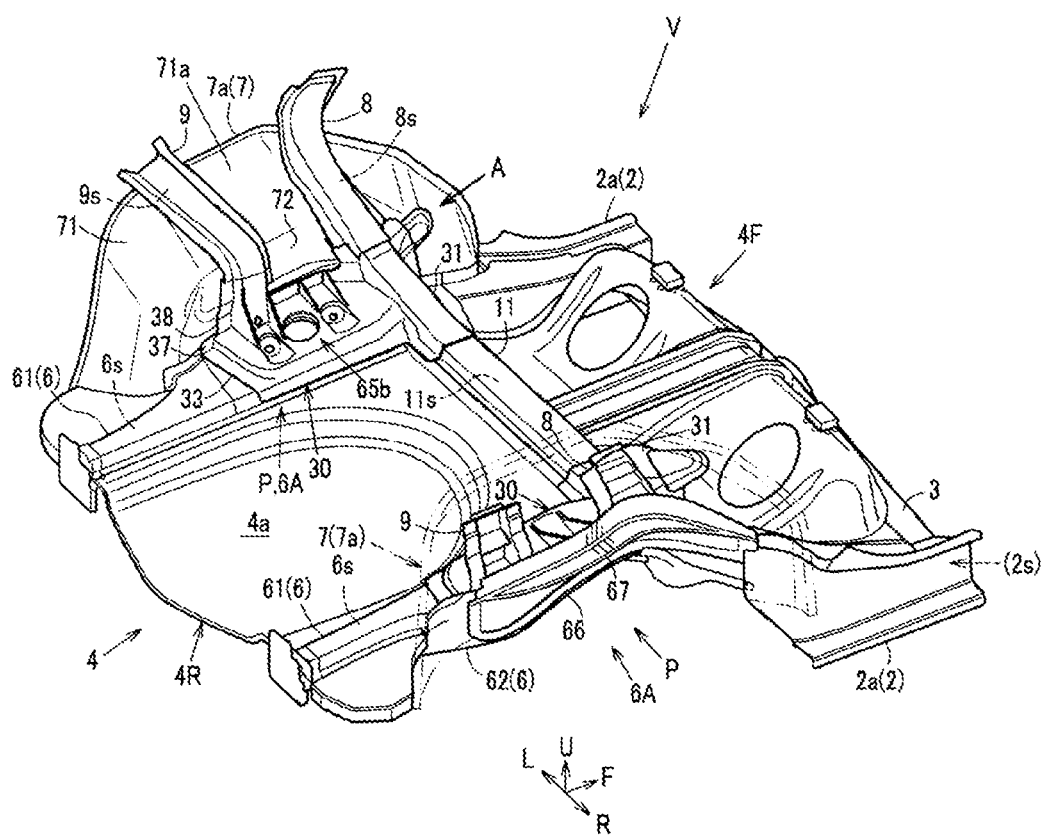
FIG. 1 is a perspective view of a rear vehicle-body structure of a present embodiment.

Hereafter, an embodiment of the present invention will be specifically described referring to the drawings.

In the figures, an arrow F shows a vehicle front side, an arrow R shows a vehicle right side, an arrow L shows a vehicle left side, an arrow U shows a vehicle upper side, an arrow out shows an outward side in a vehicle width direction, and an arrow in shows an inward side in the vehicle width direction.

Figure 2:
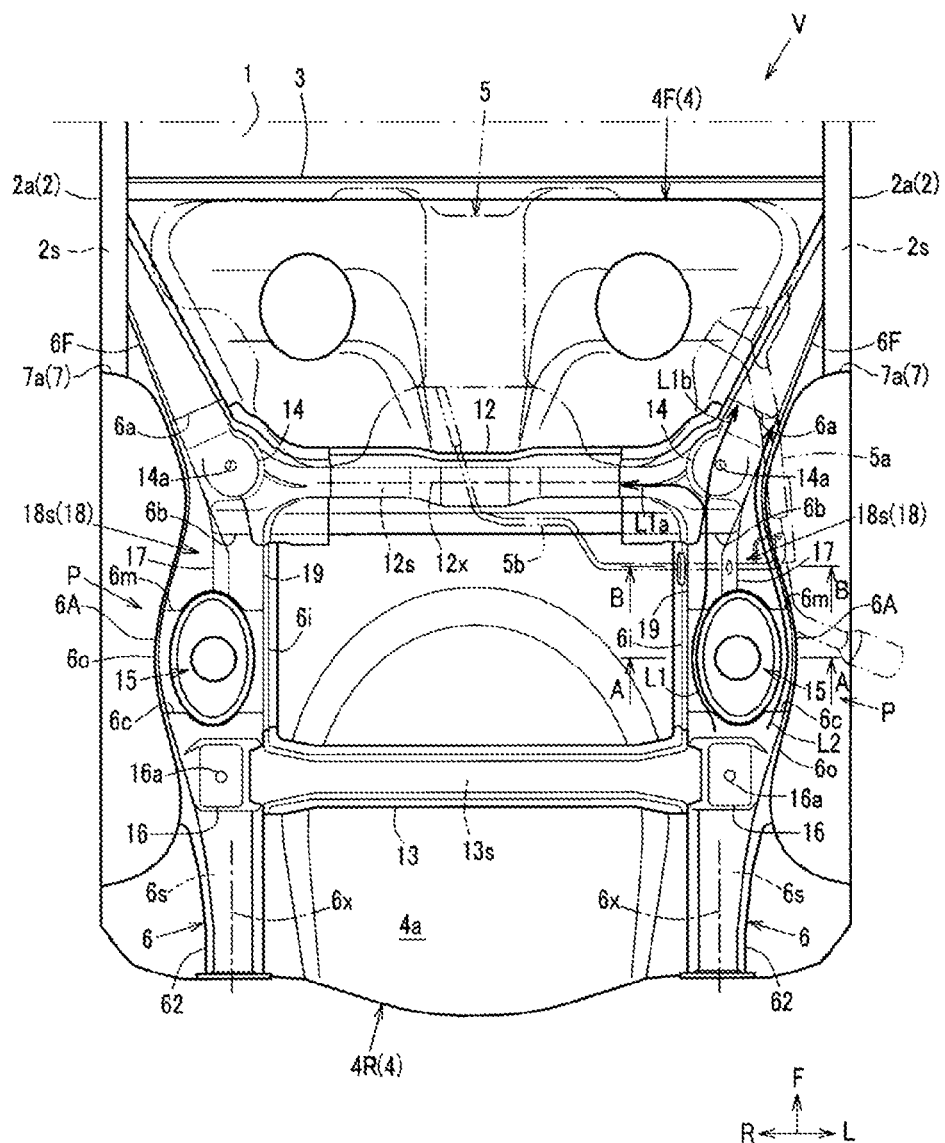
FIG. 2 is a bottom view of the rear vehicle-body structure of the present embodiment.

FIGS. 1 and 2 show a rear vehicle-body structure V of the present embodiment of the present invention, and a basic structure of the rear vehicle-body structure V of the present embodiment will be described referring to FIGS. 1 and 2 primarily first.

In a vehicle body of an automotive vehicle shown in FIG. 2, a floor panel 1 which constitutes a floor face of a cabin is provided, and side sills 2 as vehicle-body reinforcing members are fixedly joined to both sides of the floor panel 1. Herein, each of the side sills 2 comprises a side sill inner 2a and a side sill outer (not illustrated) and has a closed cross section 2s extending in a vehicle longitudinal direction.

As shown in FIGS. 1 and 2, a rear floor panel 4 is integrally connected to a rear portion of the floor panel 1 which constitutes a vehicle-body rear floor via a kick-up portion 3 which is configured to rise upwardly, and rear side frames 6 (hereafter, referred to as the "frame members 6") which extend in the vehicle longitudinal direction are provided at both sides of the rear floor panel 4.

As shown in FIG. 2, a fuel tank 5 is arranged below a front portion 4F ((hereafter, referred to as the "rear floor front portion 4F") of the rear floor panel 4. The fuel tank 5 is protected by an insulator, not illustrated.

As shown in the same figure, the fuel tank 5 is equipped with a fuel pipe 5a (filler pipe 5a) for supplying fuel into the fuel tank 5 from a fuel supply port (not illustrated) positioned inside a filler rid (not illustrated) provided at an a left-side face of a rear portion of the vehicle body and a breather pipe 5b as a passage of evaporated fuel. The fuel pipe 5a and the breather pipe 5b are arranged at the vehicle left side such that they extend from below the rear floor panel 4 of the vehicle across the left-side frame member 6.

As shown in FIG. 1, at a rear portion 4R of the rear floor panel 4 (hereafter, referred to as the "rear-floor rear portion 4R") is integrally formed a concave portion 4a which serves as a spare tire pan which is configured such that a middle part, in the vehicle width direction, of the rear-floor rear portion 4R is concaved downwardly or any other components.

The above-described frame member 6 is constituted as a vehicle-body side-portion rigidity member which is configured to have a closed cross section 6s extending in the vehicle longitudinal direction from the kick-up portion 3 to a rear end of the rear floor panel 4. A front end of the frame member 6 is connected to a rear portion of the side sill 2.

As shown in FIGS. 1 and 2, the frame member 6 comprises a frame member upper 61 (see FIG. 1) which has an upwardly-protruding hat-shaped cross section over a whole part of the vehicle longitudinal direction, a frame member lower 62 (see FIG. 2) which has a downwardly-protruding hat-shaped cross section, and others. The frame member upper 61 and the frame member lower 62 include flange portions 61a, 62a at respective inward ends, in the vehicle width direction, of these members 61, 62 (see FIGS. 5 and 6), and an outward end portion 4b, in the vehicle width direction, of the rear floor panel 4 which is interposed between these members 61, 62 is welded together with the members 61, 62 such that a three-layer joining is provided (see the same figures).

As shown in FIGS. 1 and 2, a rear wheel house 7 is provided on the outward side, in the vehicle width direction, of the frame member 6. The rear wheel house 7 is formed by joining a rear wheel house outer, not illustrated, and a rear wheel house inner 7a (hereafter, referred to as the "wheel house inner 7a").

As shown in FIG. 1, front-and-rear side braces 8, 9 to reinforce the wheel house inner 7a are joined to the wheel house inner 7a from respective inward sides, in the vehicle width direction, of the side braces 8, 9. Closed cross sections 8s, 9s are respectively formed between the front-and-rear side braces 8, 9 and the wheel house inner 7a.

As shown in the same figure, the front-and-rear side braces 8, 9 are arranged in front and back of a top portion 71a of an arch portion 71 of the wheel house inner 7a which is formed in an arch shape in a side view, and these braces 8, 9 respectively extend upwardly from a middle position, in a vertical direction, of a vertical wall portion 72 of the wheel house inner 7a.

Figure 11:
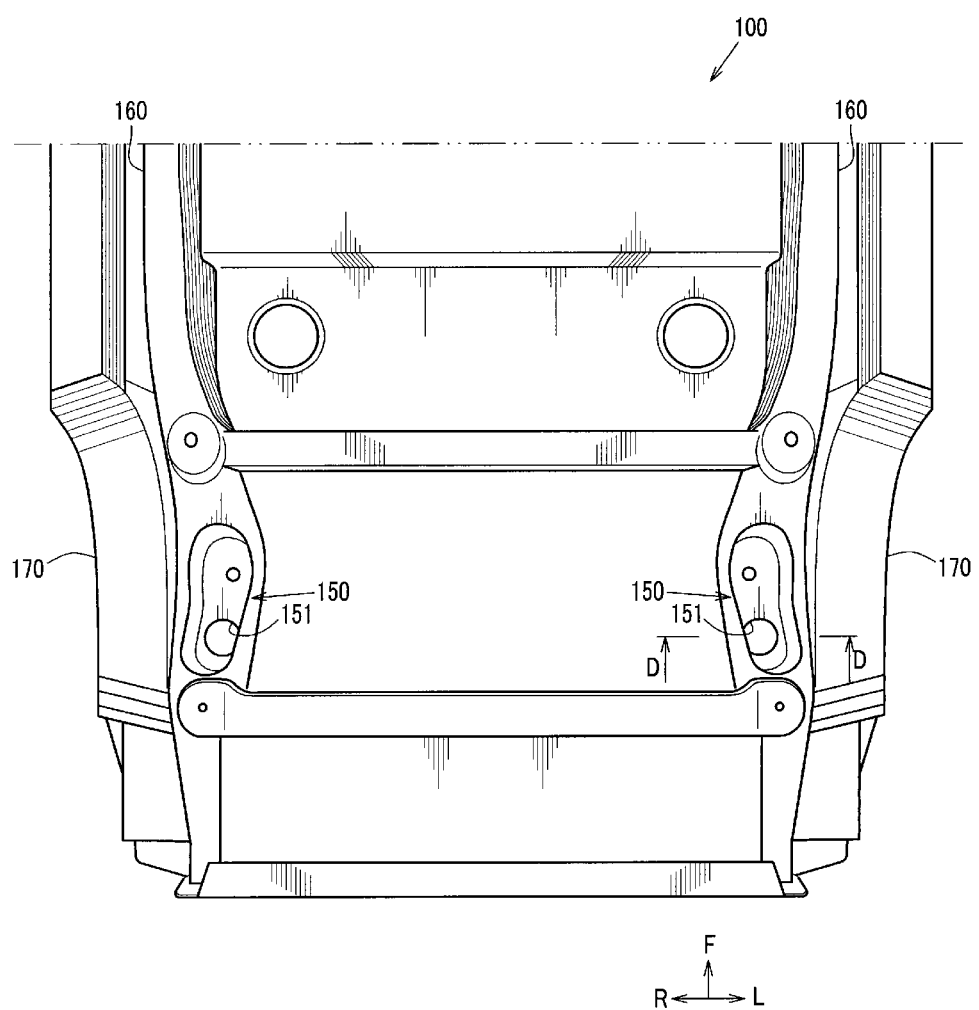
FIG. 11 is a bottom view of a conventional rear vehicle-body structure.
Figure 12:
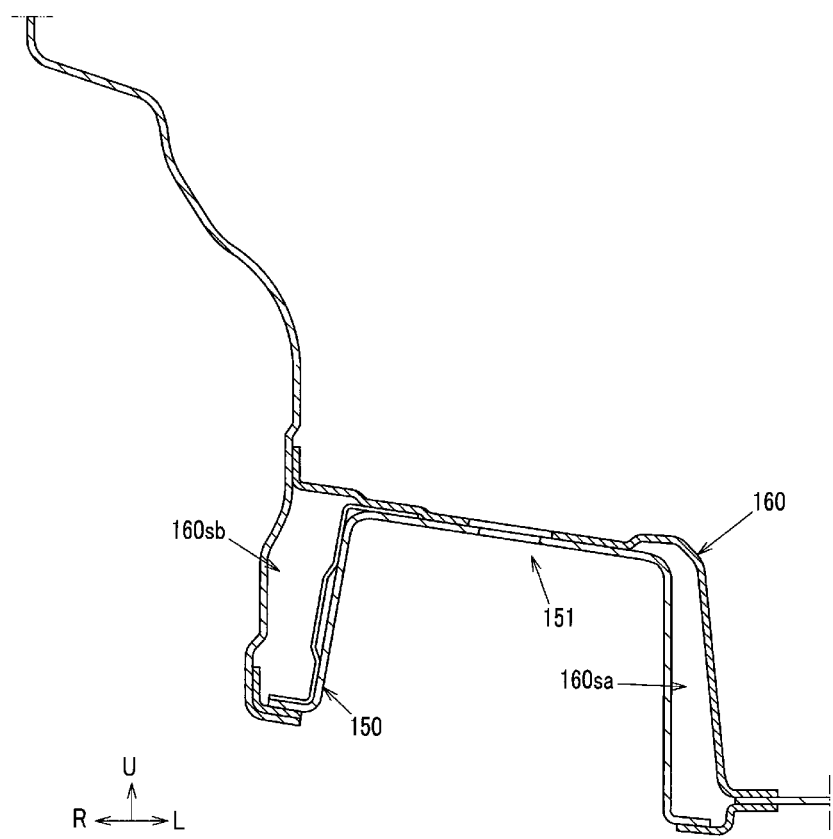
FIG. 12 is an enlarged sectional view taken along line D-D of FIG. 11.

Further, as shown in FIGS. 1 and 2, a rear cross member upper 11 (see FIG. 11) and a rear cross member lower 12 (see FIG. 2) are fixedly joined to upper-and-lower both portions of the rear floor panel 4 at a border portion of the rear floor front portion 4F and the rear-floor rear portion 4R. These 11, 12 are rear cross members (a so-called No. 4 cross member) which extend in the vehicle width direction and interconnect the both-side frame members 6, respectively. Closed cross sections 11s, 12s which overlap in the vertical direction are formed between the rear cross member upper 11 and the rear floor panel 4 and also between the rear cross member lower 12 and the rear floor panel 4.

Moreover, as shown in FIG. 2, a rear-side rear cross member 13 (a so-called No. 5 cross member) which extends in the vehicle width direction across the concave portion 4a of the rear-floor rear portion 4R and interconnects the both-side frame members 6 is fixedly joined to the rear-floor rear portion 4R from a lower-face side of the rear-floor rear portion 4R. A closed cross section 13s which extends in the vehicle width direction is formed between the rear-side rear cross member 13 and the rear floor panel 4.

Subsequently, details of the rear vehicle-body structure V of the present embodiment will be described. Herein, since the rear vehicle-body structure V is laterally symmetrical, the rear vehicle-body structure V will be described based on a left-side structure of the vehicle body referring to FIGS. 3-7, in addition to FIGS. 1 and 2.

As shown in FIG. 2, the frame member 6 of the present embodiment is provided with suspension-component attachment portions 14 (15), 16 at a middle position, in the vehicle longitudinal direction, of the frame member 6 (a position corresponding to a rear suspension, not illustrated).

Figure 3:
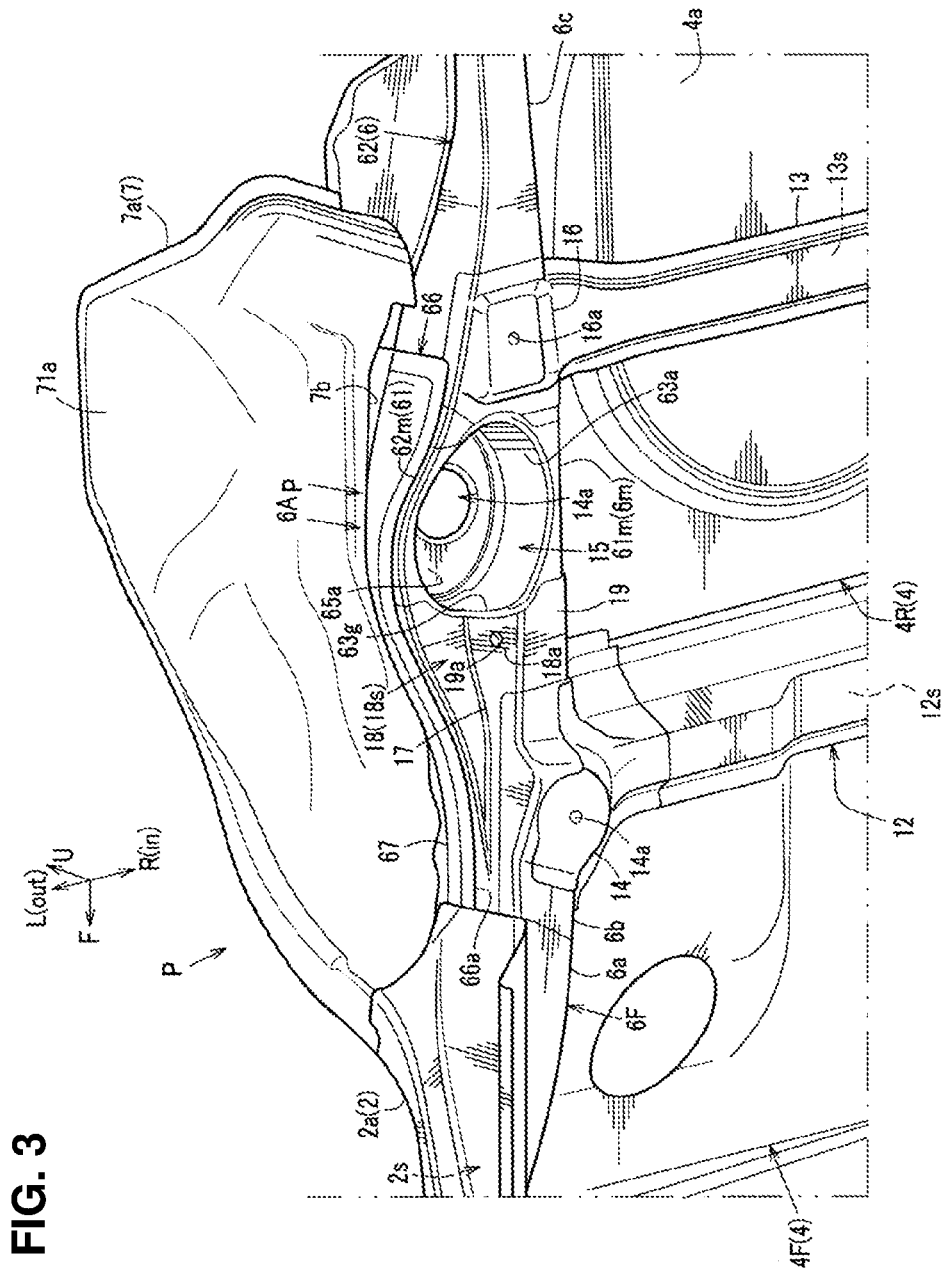
FIG. 3 is a perspective view of a major part of the rear vehicle-body structure of the present embodiment, when viewed from an outward side in a vehicle width direction and a bottom-face side.

As shown in FIGS. 2 and 3, the suspension-component attachment portions 14 (15), 16 comprise a front-side suspension-component attachment portion 14, a damper support portion (15), and a rear-side suspension-component attachment portion 16 which are provided along the vehicle longitudinal direction at the middle position, in the vehicle longitudinal direction, of the frame member 6.

The front-side suspension-component attachment portion 14 is configured to protrude downwardly in a pedestal shape, having a bolt insertion hole 14a, at a position located in front of the middle position, in the vehicle longitudinal direction, of the frame member 6. Herein, a rear-suspension component, such as a suspension cross member, not illustrated, or a trailing arm, is attachable to the attachment portion 14 by means of a bolt for suspension attaching (not illustrated) to be inserted in the bolt insertion hole 14a.

The rear-side suspension-component attachment portion 16 is configured to protrude downwardly in a pedestal shape, having a bolt insertion hole 16a, at a position located in back of the front-side suspension-component attachment portion 14. Herein, a rear-suspension component, such as a suspension cross member, is attachable to the attachment portion 16 by means of a bolt for suspension attaching (not illustrated) to be inserted in the bolt insertion hole 16a.

The above-described rear cross members 11, 12 are joined to the both-side frame members 6 from the inward side in the vehicle width direction at a position corresponding to the front-side suspension-component portion 14 in the vehicle longitudinal direction (see FIGS. 2 and 3). The above-described rear-side rear cross member 13 is joined to the both-side frame members 6 from the inward side in the vehicle width direction at a position corresponding to the rear-side suspension-component portion 16 in the vehicle longitudinal direction (see the same figures).

Figure 5:
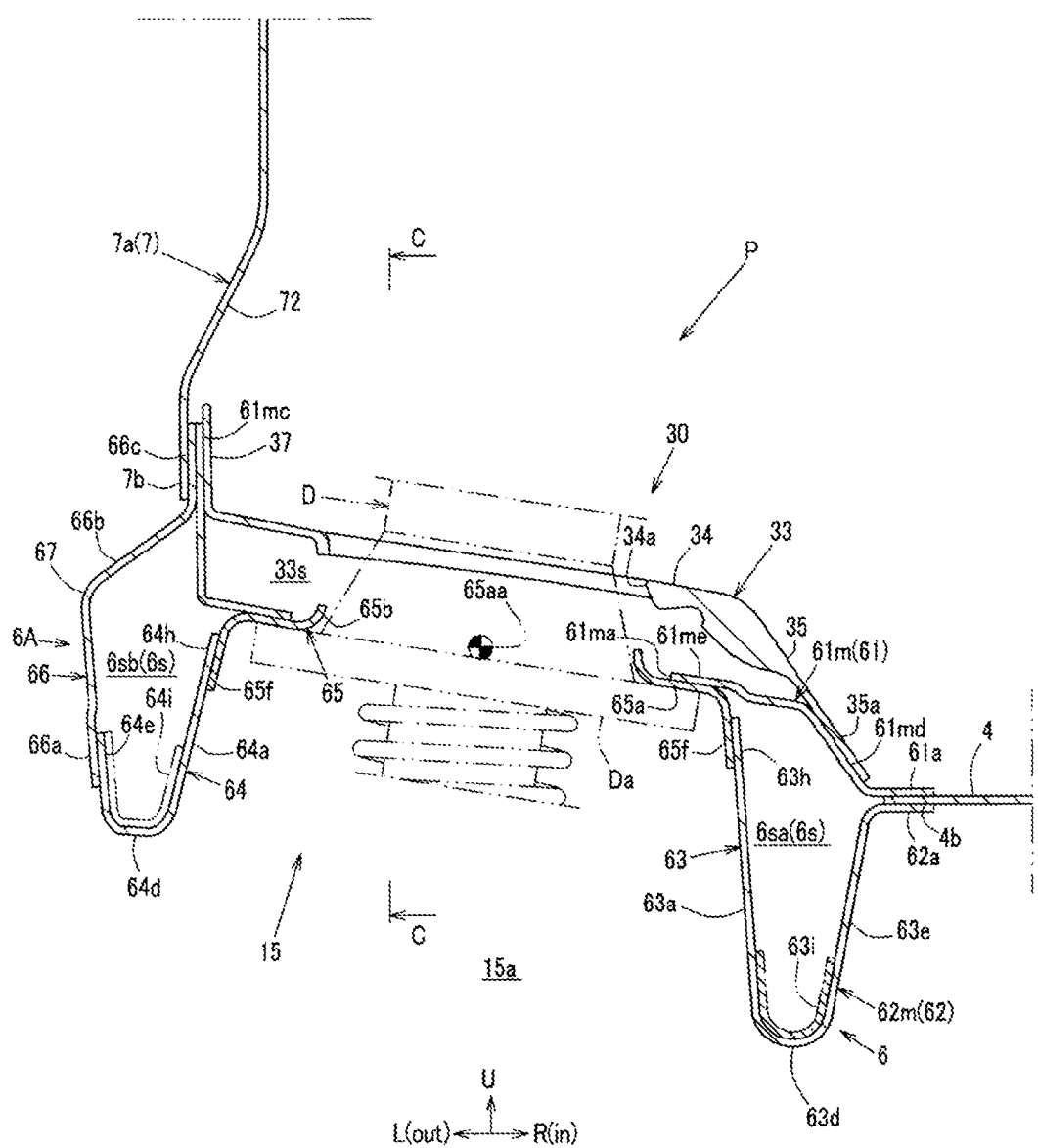
FIG. 5 is an enlarged sectional view taken along line A-A of FIG. 2.

Meanwhile, as shown in FIGS. 3 and 5, a recessed portion 15 which is configured such that a central part, in the vehicle width direction, of a lower face of the frame member 6 is recessed upwardly is formed at a position located between the front-and-rear suspension-component attachment portions 14, 15, in other words, at a middle position, in the vehicle longitudinal direction, of the wheel house inner 7a (a position corresponding to the top portion 71a (see FIG. 3)) of the frame member 6. Herein, FIG. 5 shows a sectional view taken along line A-A of FIG. 2, specifically a cross section of the frame member 6 at a recessed-portion corresponding position P in the vehicle longitudinal direction.

The recessed portion 15 has an opening portion 15a which is opened in the vertical direction at the central part, in the vehicle width direction, of the lower face of the frame member 6 (see FIG. 5), and this is configured as the above-described damper support portion (15) where a damper D (see FIG. 5) of the rear suspension, not illustrated, is fixed, being inserted through the opening portion 15a.

That is, as shown in FIG. 2, the damper support portion (15) of the present embodiment is formed by providing the recessed portion 15 at the frame member 6, and a wide portion 6A of the frame member 6 which is configured to be outwardly wider in the vehicle width direction than any other portion of the frame member 6 is formed at the position P, in the vehicle longitudinal direction, of the frame member 6 which corresponds to the recessed portion 15 (i.e., the recessed-portion corresponding position P) (see FIGS. 2 and 3).

Accordingly, as shown in FIG. 5, at the recessed-portion corresponding position P of the frame member 6 are provided a closed cross section 6sa which is positioned on the inward side in the vehicle width direction (the inward-side closed cross section 6sa) and another closed cross section 6sb which is positioned on the outward side in the vehicle width direction (the outward-side closed cross section 6sb) which branch off from the longitudinally-extending closed cross section 6s of the frame member 6 inwardly and outwardly, respectively, in the vehicle width direction relative to the damper D which inserted into and fixed to the recessed portion 15.

Thereby, as shown in FIG. 2, a load path of a rear-collision load which is transmitted forwardly passing through the recessed-portion corresponding position P of the frame member 6 in a vehicle rear collision is constituted by two load paths L1, L2 which respectively correspond to the inward-side closed cross section 6sa and the outward-side closed cross section 6sb at the recessed-portion corresponding position P.

Further, in the rear vehicle-body structure V of the present embodiment, the recessed portion 15 is provided at the frame member 6 so that the frame member 6 can have a damper-support function.

Accordingly, the both-side frame members 6 are provided to be offset inwardly in the vehicle width direction as a whole (i.e., their parallelly-extending portions of the both-side frame members are provided to be offset inwardly in the vehicle width direction), compared to the conventional structure where the frame member, the damper support portion, and the wheel house inner are separately arranged from the inward side toward the outward side in the vehicle width direction.

That is, since the frame member 6 of the present embodiment is configured such that its axial center 6x (see FIG. 2) extending along its longitudinal direction (the vehicle longitudinal direction) is offset inwardly in the vehicle width direction, compared to the conventional structure described above, its inwardly-offset amount from the side sill 2 becomes greater than that of the conventional structure.

As shown in FIGS. 2 and 3, the frame member 6 of the present embodiment is configured such that another part than its front part extends substantially in parallel to the vehicle longitudinal direction. Also, its front part has an oblique portion 6F which is configured to extend obliquely forwardly and outwardly, and a front end of the oblique portion 6F (i.e., a front end of the frame member 6) is joined to a rear portion of the side sill 2 (see the same figures).

Since the frame member 6 is configured such that the front part has the oblique portion 6F and the front end is connected to the side sill 2 as described above, the front end of the frame member 6 can be smoothly connected to the rear portion of the side sill 2 even in the structure of the present embodiment in which the frame member 6 is inwardly offset from the side sill 2 in the vehicle width direction. Accordingly, the rear-collision load can be efficiently transmitted from the frame member 6 to the side sill 2 in the vehicle rear collision.

Herein, the oblique portion 6F of the present embodiment corresponds to a section of the frame member 6 which is located from a position located between the recessed-portion corresponding position P and the front-side suspension-component attachment portion 14 (in other words, a position corresponding to a front end of the wide portion 6A) to the front end of the frame member 6.

Further, as shown in FIGS. 2 and 3, a front portion of the oblique portion 6F overlaps a rear portion of the side sill inner 2a, that is, overlaps, in the vehicle longitudinal direction, an area from a rear end of the side sill inner 2a to a position behind the kick-up portion 3. The front portion of the oblique portion 6F is joined to the rear portion of the side sill inner 2a from the inward side in the vehicle width direction at this overlapping area.

Further, the frame member 6 of the present embodiment is provided with the wide portion 6A at the recessed-portion corresponding position P according to providing the recessed portion 15 as the damper support portion (15) as descried above. In particular, this wide portion 6A is configured such that a part of the frame member 6 is widened outwardly in the vehicle width direction (see the same figures).

The axial center 6x (see FIG. 2) of the frame member 6 can be made offset outwardly in the vehicle width direction (toward the side sill 2 in the vehicle width direction) at the recessed-portion corresponding position P (the wide portion 6A), compared to a case where the wide portion 6A is not formed, so that any harmful influence which may be caused by providing the recessed portion 15 at the frame member 6 can be corrected.

Specifically, the inwardly-offset amount of the frame member 6 relative to the side sill 2 becomes large by providing the recessed portion 15 at the frame member 6, so that smooth transmission of the rear-collision load from the frame member 6 to the side sill 2 in the vehicle rear collision is so hindered that there is a concern that there may occur deformation in that the overlapping amount, in the vehicle longitudinal direction, of the front portion of the frame member 6 and the rear portion of the side sill 2 becomes large, that is, the frame member and the side sill member produce together a Z shape in a plan view. However, this harmful influence can be suppressed by the above-described structure of the present embodiment.

The above-described wide portion 6A is configured such that an outward edge portion 6o, in the vehicle width direction, of the frame member 6 is positioned gently outwardly in the vehicle width direction over an area from a place located behind the rear-side suspension-component attachment portion 16 to another place located right behind the front-side suspension-component attachment portion 14 so that the recessed-portion corresponding position P is located at the most outward position (see FIG. 2).

Meanwhile, an inward edge side 6i, in the vehicle width direction, of the frame member 6 is positioned substantially linearly along the vehicle longitudinal direction over an area from a rear end of the frame member 6 to its joint portion to rear cross member lower 12, without being positioned inwardly in the vehicle width direction at the wide portion 6A including the recessed-portion corresponding position P (see FIG. 2).

That is, the wide portion 6A is configured such that only the outward edge portion 6o of the frame member 6 protrudes toward the wheel house inner 7a at the recessed-portion corresponding position P. Herein, the recessed portion 15 is of an ellipse (oval) shape having a major axis which matches the vehicle longitudinal direction in a bottom view, and a center of FIG. 65aa (see FIG. 5) of the recessed portion 15 is positioned at a central portion, in the vehicle width direction, of the wide portion 6A (the recessed-portion corresponding position P) of the frame member 6.

Thereby, as shown in FIG. 2, in the load paths L1, L2 of the rear-collision load which pass through the recessed-portion corresponding position P of the frame member 6 in the vehicle rear collision, the load path L2 passing through the outward-side closed cross section 6sb proceeds forwardly, going outwardly around the recessed portion 15 at the recessed-portion corresponding position P of the frame member 6, whereas the load path L1 passing through the inward-side closed cross section 6sa proceeds linearly forwardly along the longitudinal direction of the frame member 6 (the vehicle longitudinal direction) without going inwardly around the recessed portion 15.

Figure 6:
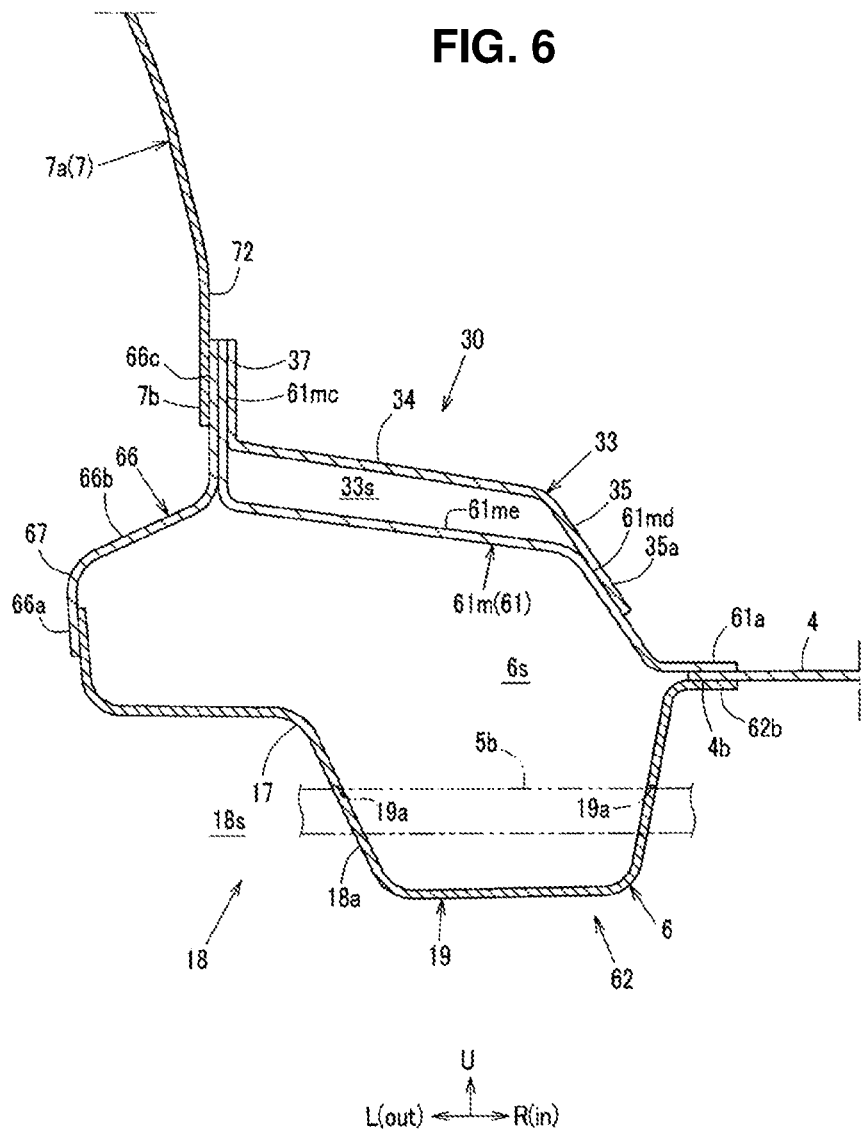
FIG. 6 is an enlarged sectional view taken along line B-B of FIG. 2.

Further, as shown in FIGS. 2, 3 and 6, a ridgeline 17 which extends continuously in the longitudinal direction of the frame member 6 (the vehicle longitudinal direction) is formed at a portion of a lower face portion of the frame member 6 which is positioned in front of the recessed-portion corresponding position P.

As shown in FIGS. 2 and 3, the ridgeline 17 extends forwardly from a front lower end of the recessed portion 15 (a font end of the opening portion 15a of the recessed portion 15) up to a position located beyond the rear cross member lower 12 in the vehicle longitudinal direction of the frame member 6.

More specifically, the ridgeline 17 extends forwardly from the front lower end of the recessed portion 15 beyond a position which corresponds to an axial center 12x extending in the vehicle width direction of the rear cross member lower 12 (see FIG. 2).

Further, as shown in FIG. 2, a front portion of the ridgeline 17 (a portion positioned in front of a front-end corresponding position of the wide portion 6A) extends along an outward edge, in the vehicle width direction, of the front-side suspension-component attachment portion 14 such that its front side is positioned on the outward side in the vehicle width direction along the oblique shape of the front portion (the oblique portion 6F) of the frame member 6, and its front end joins the outward edge portion 6o of the frame member at a position right before the side will inner 2a. Thereby, the lower face of the front portion of the frame member 6 (the portion of the frame member 6 which is positioned in front of the front end of the ridgeline 17) is configured not to have a step face 18a, which will be described later, so that the lower face of the frame member 6 becomes flat in the vehicle width direction.

As shown in FIGS. 2, 3 and 6, a (upwardly-concaved) step portion 18 where an outward-side portion, in the vehicle width direction, of the lower face of the frame member 6 is located at a higher level than an inward-side portion, in the vehicle width direction, of the lower face of the frame member 6 is formed at a corner portion of an outward-side lower portion of a portion of the frame member 6 which is positioned in front of the recessed-portion corresponding position P by providing the ridgeline 17 at the lower face of the frame member 6. This step portion 18 can form a space 18s which is opened downwardly and outwardly at a position located on the outward side in the vehicle width direction and below the ridgeline 17 of the frame member 6.

In other words, as shown in FIG. 3, by providing the ridgeline 17 at the lower face of the frame member 6, the cross section of the lower portion of the frame member 6 is configured in a step shape relative to the ridgeline 17 such that its inward-side portion protrudes downwardly relative to its outward-side portion (the step portion 18), and a step face 18a which extends in the vertical direction is formed along the ridgeline 17 at a position corresponding to the ridgeline 17 in the vehicle width direction.

That is, the step face 18a is configured to connect the inward-side lower face of the frame member 6 and the outward-side lower face of the frame member 6 which is located at the higher level than the inward-side lower face in the vertical direction. The ridgeline 17 is provided along the corner portion of the outward-side lower face and the step face 18a of the frame member 6.

Herein, as shown in FIGS. 3 and 6, at a downward protrusion portion 19 which is a portion of the lower face of the frame member 6 which is positioned on the inward side, in the vehicle width direction, of the ridgeline 17 is provided a pipe insertion portion 19a where the breather pipe 5b which is provided to extend in the vehicle width direction across the downward protrusion portion 19 is inserted.

Accordingly, while the fuel pipe 5a and the breather pipe 5b which extend from the fuel tank 5 are provided to extend from the inward side to the outward side in the vehicle width direction across the frame member 6, the fuel pipe 5a extends below and across the oblique portion 6F of the frame member 6 (see FIG. 2), whereas the breather pipe 5b extends across the downward protrusion portion 19 of the frame member 6 in a state of its being inserted into the pipe insertion portion 19a (see FIGS. 2 and 6).

Herein, while the present embodiment is configured such that only the breather pipe 5b is provided to extend across the downward protrusion portion 19 in the state of its being inserted into the pipe insertion portion 19a, the present invention is not limited to this structure, but a structure in which a pipe insertion portion where the fuel pipe 5a or any other pipe are inserted is provided at the downward protrusion portion 19 of the frame member, which is not illustrated, is applicable as well.

While the breather pipe 5b is configured, as described above, to be inserted into the pipe insertion portion 19a provided at the downward protrusion portion 19 of the frame member 6 from the inward side in the vehicle width direction and extend outwardly in the vehicle width direction, an extension portion of the breather pipe 5b may be arranged in the space 18s which is positioned at the outward-lower portion of the frame member 6.

That is, by arranging the extension portion of the breather pipe 5b of the breather pipe 5b which extends outwardly in the vehicle width direction relative to the frame member 6 (the downward protrusion portion 19) at the space 18s formed by the step portion 18, the layout performance (arranging performance) of the extension portion can be improved.

Accordingly, the layout performance (arranging performance) of the extension portion can be improved, holding the breather pipe 5b at the frame member 6 (the downward protrusion portion 19) by being inserted into the pipe insertion portion 19a and also preventing the above-described extension portion of the breather pipe 5b from interfering with the wheel house inner 7a which is provided on the outward side of and closely to the frame member 6 by the space 18s.

As shown in FIG. 2, the frame member 6 is constituted by integrally connecting plural members 6a, 6b, 6m in the vehicle longitudinal direction, and in particular, the frame member upper 61 is constituted by a middle member 61m and the frame member lower 62 is constituted by a middle member 62m.

Figure 7:
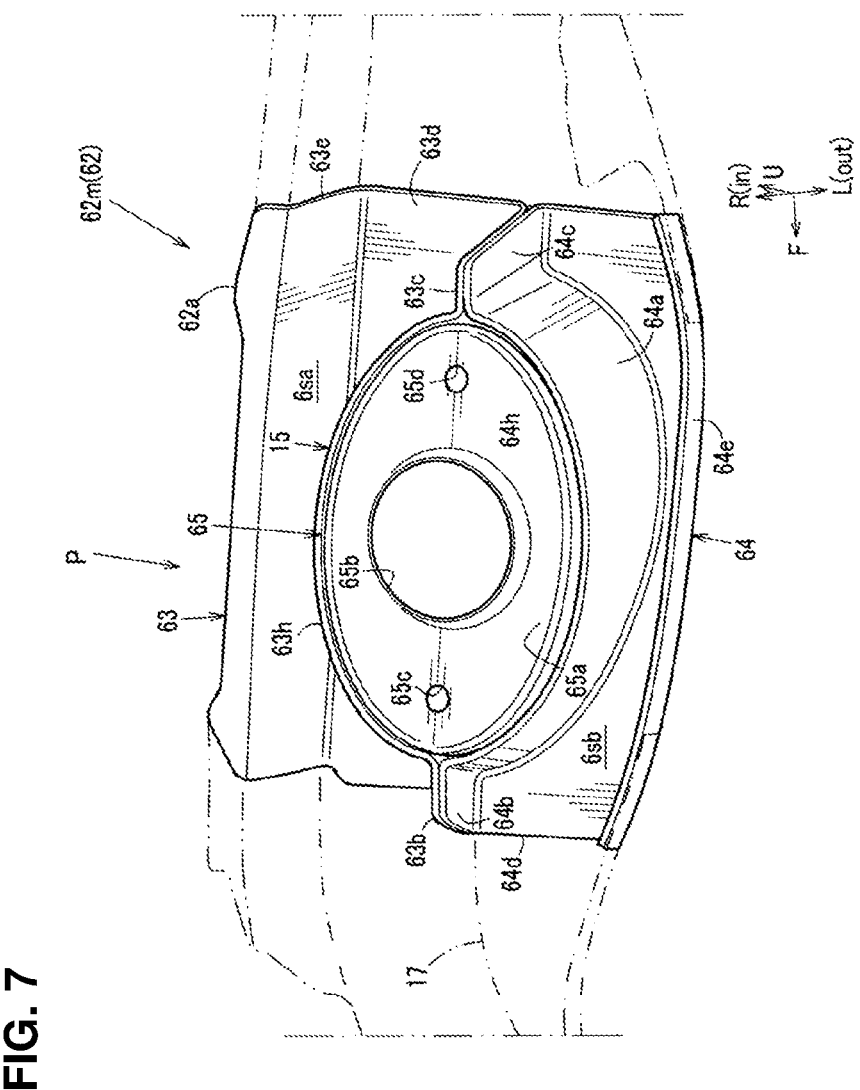
FIG. 7 is an explanatory view of an inside structure of a portion of a front side frame which corresponds to a recessed portion in a state where an upper face is removed, when viewed from an upward side and an inward side in the vehicle width direction.
Figure 8:
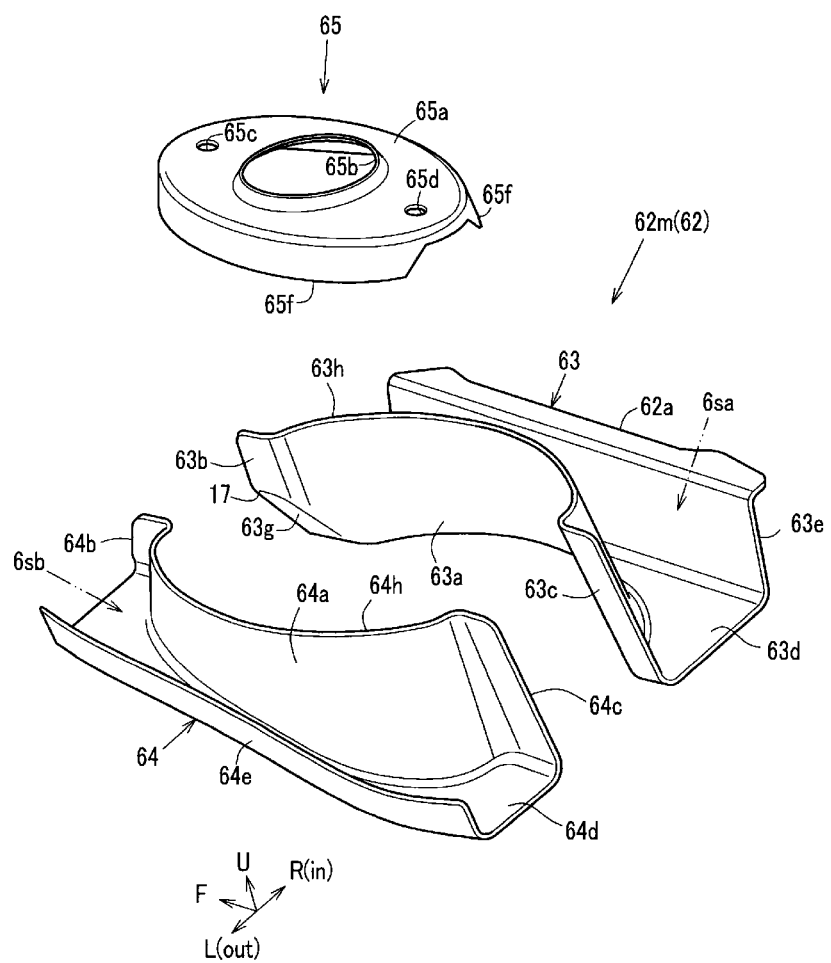
FIG. 8 is an exploded perspective view of the portion of the front side frame corresponding to the recessed portion shown in FIG. 7.

FIG. 7 is a perspective view of the recessed-portion corresponding position P, in the vehicle longitudinal direction, of the frame member 6 in a state where the middle member 61m of the frame member upper 61 is removed, when viewed from an outward-and-upward side. FIG. 8 is an exploded view of the recessed portion 15 of the frame member 6.

As shown in FIGS. 5-8, the frame member 6 is constituted, at the recessed-portion corresponding position P, in the vehicle longitudinal direction, thereof, by the frame-upper middle member 61m (see FIGS. 5 and 9) which corresponds to the middle member 61m of the frame member upper 61, the frame lower middle member 62m which corresponds to the middle member 62m of the frame member lower 62, a top-plate member 65 which attaches the damper D at a concave bottom of the recessed portion 15, and an outer panel 66 (see FIGS. 3 and 5) which constitutes an outward side face.

Further, as shown in FIGS. 5, 7 and 8, the frame lower middle member 62m is constituted by a frame-lower inward-side middle member 63 and a frame-lower outward-side middle member 64.

The frame-lower inward-side middle member 63 comprises a recess inward-side face portion 63a which protrudes inwardly in the vehicle width direction so as to constitute a side face of an inward-side half, in the vehicle width direction, of the ellipse-shaped recessed portion 15, a front-side flange portion 63b (see FIGS. 7 and 8) which extends forwardly from a front edge of the recess inward-side face portion 63a, a rear-side flange portion 63c (see the same figures) which extends rearwardly from a rear edge of the recess inward-side face portion 63a, a lower face portion 63d which extends inwardly and longitudinally relative to a lower end portion of the recess inward-side face portion 63a so as to constitute a lower face (bottom face) of the inward-side closed cross section 6sa, an inward-side face portion 63e which rises in a vertical-wall shape from an inward end, in the vehicle width direction, of the lower face portion 63d, and a joint flange portion 62a which extends inwardly from an upper end of the inward-side face portion 63e, which are all formed integrally.

Herein, as shown in FIG. 5, the joint flange portion 62a is joined to the outward-side end portion 4b of the rear floor panel 4 from the lower-face side as described.

Further, as shown in FIG. 8, the frame-lower inward-side middle member 63 is configured such that an outward-side end of the lower face portion 63d is joined not only to an entire part of the half eclipse-shaped lower end portion of the recess inward-side face portion 63a but to respective lower end portions of the front-side flange portion 63b and the rear-side flange portion 63c (specifically, a rear-end corresponding portion 63g which will be described (see FIG. 8)).

Moreover, as shown in FIGS. 3 and 8, a rear-end corresponding portion 63g of the step face 18a (see FIGS. 3 and 6) of the frame member 6 which is positioned in front of the recessed portion 15 is provided at a lower portion of a vertically-extending front edge of the recess inward-side face portion 63a. That is, as shown in FIG. 8, the rear-end corresponding portion 63g is provided at a lower portion of the front-side flange portion 63d, and the front-side flange portion 63b is integrally formed, in the vertical direction, at a front portion of the recess inward-side face portion 63a including the rear-end corresponding portion 63g. Meanwhile, the rear-side flange portion 63c is also formed at a whole part, in the vertical direction, of a rear edge of the recess inward-side face portion 63a.

As shown in FIGS. 5, 7 and 8, the frame-lower outward-side middle member 64 comprises a recess outward-side face portion 64a which protrudes outwardly in the vehicle width direction so as to constitute a side face of an outward-side half, in the vehicle width direction, of the ellipse-shaped recessed portion 15, a front-side flange portion 64b (see FIGS. 7 and 8) which extends forwardly from a front edge of the recess outward-side face portion 64a, a rear-side flange portion 64c (see the same figures) which extends rearwardly from a rear edge of the recess outward-side face portion 64a, a lower face portion 64d which extends outwardly and longitudinally relative to a lower end portion of the recess inward-side face portion 64a so as to constitute a lower face (bottom face) of the outward-side closed cross section 6sb, and a joint flange portion 64e which rises in a vertical-wall shape from an outward end, in the vehicle width direction, of the lower face portion 64d, which are all formed integrally.

Herein, as shown in FIGS. 7 and 8, the frame-lower outward-side middle member 64 is configured such that a vertical length of the recess outward-side face portion 64a becomes gradually smaller from the rearward side to the forward side of the vehicle by providing the step portion 18 at an outward side, in the vehicle width direction, of a front side of the recessed portion 15.

Similarly to the frame-lower inward-side middle member 63, an inward-side end of the lower face portion 64d of the frame-lower outward-side middle member 64 is joined not only to an entire part of the half eclipse-shaped lower end portion of the recess outward-side face portion 64a but to respective lower end portions of the front-side flange portion 64b and the rear-side flange portion 64c.

The joint flange portion 64e of the frame-lower outward-side middle member 64 is joined to a lower end portion of the outer panel 66 as shown in FIG. 5.

As shown in FIGS. 5, 7 and 8, the top-plate member 65 comprises a flat-plate shaped damper attachment portion 65a which is of the ellipse (oval) shape in the plan view and a joint flange portion 65f which extends downwardly from a peripheral edge of the damper attachment portion 65a except longitudinal both ends thereof, which are integrally formed.

A damper insertion hole 65b where the damper D is inserted is formed at a central portion, in the plan view, of the damper attachment portion 65a, and bolt insertion holes 65c, 65d are formed at positions of the damper attachment portion 65a which are located in front of and in back of the damper insertion hole 65b (see FIGS. 7 and 8). The damper D is attached and fixed to the damper attachment portion 65a by inserting the damper D into the damper insertion hole 65b from below, inserting bolts into the bolt insertion holes 65c, 65d in a state where a flange-shaped attachment portion Da (see FIG. 5) which is provided at the damper side contacts a lower face of the damper attachment portion 65a, and finally fastening the bolts.

The above-described recessed portion 15 is constituted by connecting the respective front-side flange portions 63b, 64b of the frame-lower inward-side middle member 63 and the frame-lower outward-side middle member 64 and also connecting the respective rear-side flange portions 63c, 64c of the frame-lower inward-side middle member 63 and the frame-lower outward-side middle member 64 (see FIG. 7). Further, as shown in FIG. 5, the recessed portion 15 is constituted by joining the joint flange portion 65f of the top-plate member 65 to respective upper portions 63h, 64h of the frame-lower inward-side middle member 63 and the frame-lower outward-side middle member 64 from the inner-face side of the recessed portion 15.

Herein, as shown in FIGS. 5 and 6, the frame-upper middle member 61m is arranged so as to cover over the frame lower middle member 62m and the top-plate member 65 which are joined integrally as described above, and as shown in FIG. 5, in particular, the frame-upper middle member 61m is joined to the upper face of the damper attachment portion 65a at a part of the frame-upper middle member 61m which corresponds to the damper attachment portion 65a in the plan view.

Figure 9:
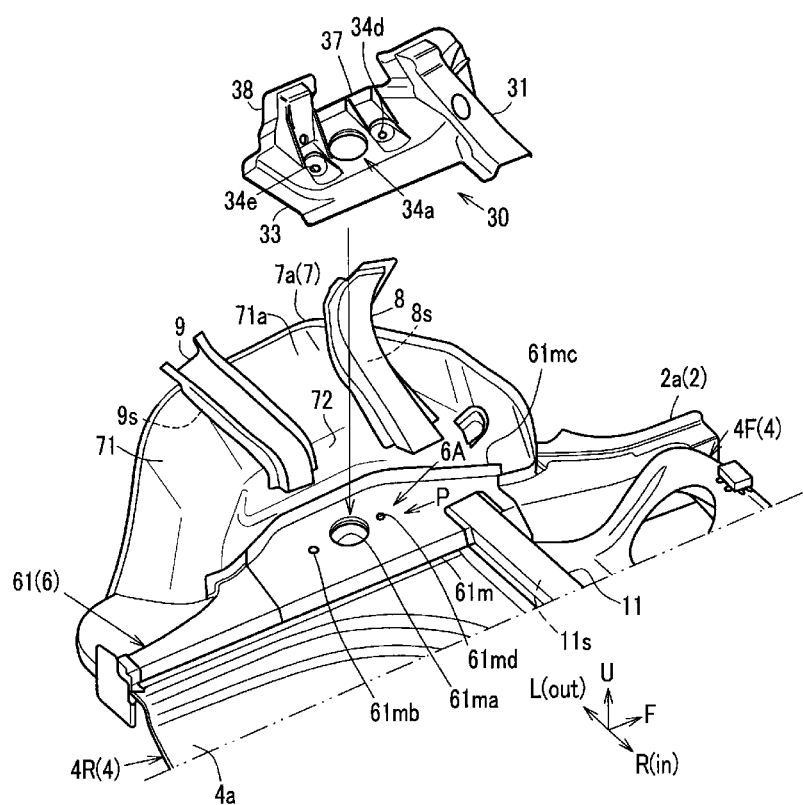
FIG. 9 is a perspective view of a major part of the rear vehicle-body structure shown in FIG. 1, which shows a state where a reinforcing member is separated from an upper face of the front side frame.

Moreover, at respective parts of the frame-upper middle member 61m which correspond to the damper insertion hole 65d and the front-side and rear-side bolt insertion holes 65c, 65d of the damper attachment portion 65a are formed a damper insertion hole 61ma (see FIGS. 5 and 9) which connects to the damper insertion hole 65b and front-side and rear-side bolt insertion holes 61mb, 61md which connect to the front-side and rear-side bolt insertion holes 65c, 65d (see FIG. 9).

As shown in FIG. 5, a lower end portion 66a of the outer panel 66 is joined to the joint flange portion 64e of the frame-lower outward-side middle member 64 as described above. Moreover, the outer panel 66 is provided with an upper-end flange portion 66c which rises further upwardly from a body portion 66b which constitutes at least an outward-side face of the recessed-portion corresponding position P of the frame member 6 (see FIG. 5).

Meanwhile, as shown in FIGS. 5 and 6, the frame-upper middle member 61m is provided with an outward-side flange portion 61mc which rises in a vertical-wall shape from an outward end, in the vehicle width direction, of the frame-upper middle member 61m.

As shown in the same figure, the upper-end flange portion 66c of the outer panel 66, the outward-side flange portion 61mc of the frame-upper middle member 61m, the lower end portion 7b of the wheel house inner 7a, and an upper flange portion 37 of a reinforcing member 30, which will be described later, are joined by rivets (not illustrated) or the like in a state where the upper-end flange portion 66c and the outward-side flange portion 61mc are interposed between the lower end portion 7b of the wheel house inner 7a and the upper flange portion 37.

Accordingly, as shown in FIG. 5, the inward-side closed cross section 6sa is constituted primarily by the frame-lower inward-side middle member 63 and the frame-upper middle member 61m, whereas the outward-side closed cross section 6*sb* is constituted primarily by the frame-lower outward-side middle member 64 and the frame-upper middle member 61*m*.

As shown in FIGS. 3, 5 and 6, the outer panel 66 continuously extends forwardly from a portion of the frame member 6 which corresponds to the rear-side suspension-component attachment portion 16 in the vehicle longitudinal direction, passing through the recessed-portion corresponding position P.

As shown in FIG. 3, the outer panel 66 extends along the oblique shape of the oblique portion 6F up to the rear end of the side sill inner 2*a* so as to constitute not only an outward-side face of the recessed-portion corresponding position P of the frame member 6 but an outward-side face of the portion of the frame member 6 which corresponds to the oblique portion 6F.

A front end of the outer panel 66 is joined to a rear end of the side sill inner 2*a*.

Specifically, the lower end portion 7*b* of the wheel house inner 7*a*, the front end of the outer panel 66, and the rear end of the side sill inner 2*a* are three-layer joined by rivets or the like in a state where the front end of the outer panel 66 is interposed between the lower end portion 7*b* of the wheel house inner 7*a* and the rear end of the side sill inner 2*a* (not illustrated).

Further, as shown in FIGS. 3 and 6, a ridgeline 67 which protrudes outwardly in the vehicle width direction is formed at the outer panel 66. This ridgeline 67 continuously extends in a longitudinal direction of the outer panel 66 (in the vehicle longitudinal direction) over an area from the recessed-portion corresponding position P to it joint portion to the side sill 2, thereby increasing the strength of the outer panel 66 extending along the oblique shape of the oblique portion 6F.

In the present embodiment, as shown in FIGS. 1, 4-6, 9 and 10, the reinforcing member 30 to reinforce the recessed-portion corresponding position P of the frame member 6, in particular, is provided at an upper portion of the frame member 6.

The reinforcing member 30 comprises a connecting member portion 31 (see FIGS. 1, 4 and 9) which connects the front-side side brace 8 and the rear cross member upper 11 at a position, in the vehicle longitudinal direction, of the frame member 6 which is located in front of the recessed-portion corresponding position P and a reinforcing-member body portion 33 which is positioned in back of the connecting member portion 31, which are formed integrally by aluminum die-casting.

Figure 4:
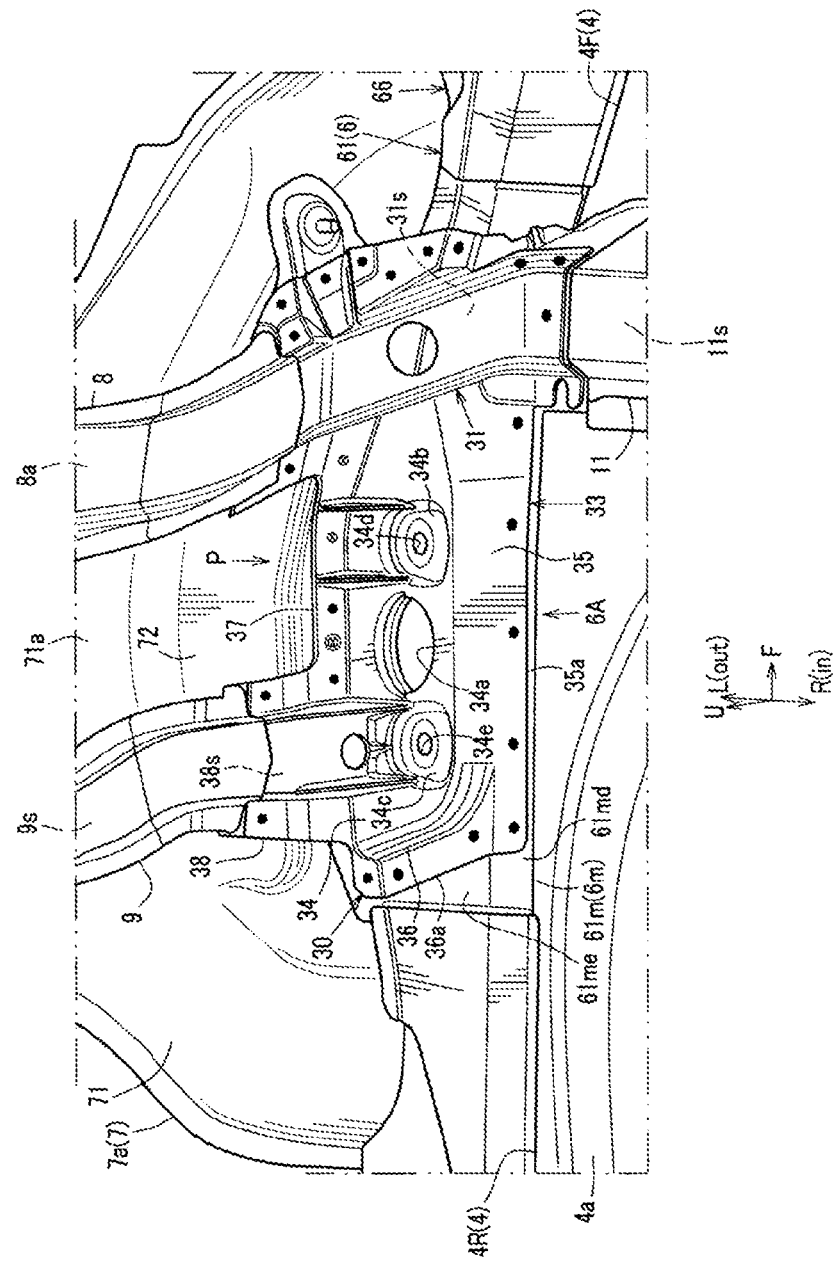
FIG. 4 is an enlarged view of the major part of the rear vehicle-body structure of the present embodiment, when viewed from an arrow A of FIG. 1.

As shown in FIGS. 1, 4 and 9, the connecting member portion 31 extends in the vehicle width direction above and across the frame member 6, and an outward end, in the vehicle width direction, thereof is connected to a lower end of the front-side side brace 8 and an inward end, in the vehicle width direction, thereof is connected to an outward end, in the vehicle width direction, of the rear cross member upper 11 from above. Accordingly, the front-side side brace 8 and the rear cross member upper 11 extend continuously via the connecting member portion 31 (see FIGS. 1 and 4).

The connecting member portion 31 is joined to the frame member 6 and the wheel house inner 7*a* such that a closed cross section 31*s* (see FIG. 10) is formed at a corner portion of an inward face, in the vehicle width direction, of the vertical wall portion 72 of the wheel house inner 7*a* and an upper face of the frame member 6.

Figure 10:
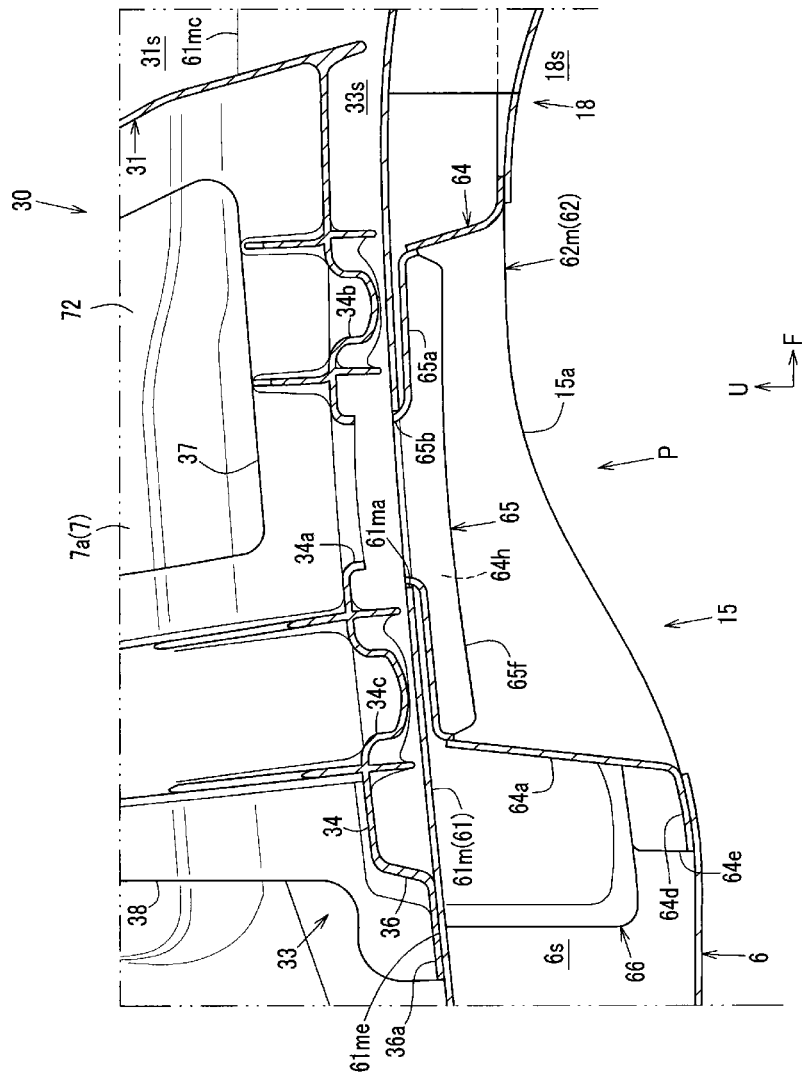
FIG. 10 is a sectional view taken along line C-C of FIG. 5.

As shown in FIGS. 1, 4 and 10, the reinforcing-member body portion 33 is long enough, in the vehicle longitudinal direction, to pass through the recessed corresponding position P of the frame member 6, and as shown in FIGS. 4-6, this body portion 33 is integrally formed by an upper wall portion 34, an inward wall portion 35, and a rear wall portion 36 (see FIG. 4) and others.

As shown in FIGS. 5, 6 and 10, the reinforcing-member body portion 33 is joined to the frame member 6 and the wheel house inner 7*a* such that a closed cross section 33*s* which extends in the vehicle longitudinal direction is formed at least at the corner portion of the frame member 6 and the wheel house inner 7*a*.

As described above, the rear vehicle-body structure V of the present embodiment comprises the frame member 6 provided at the rear portion of the vehicle body and having the closed cross section 6*s* extending in the vehicle longitudinal direction (see FIGS. 1 and 2), the recessed portion 15 formed at the frame member 6, wherein the recessed portion 15 is configured such that the central part, in the vehicle width direction, of the lower face of the frame member 6 is recessed upwardly, and the damper D (see FIG. 5) of the rear suspension is inserted into and fixed to the recessed portion 15 (see FIGS. 2 and 3), and the inward-side and outward-side closed cross sections 6*sa*, 6*sb* formed inside the frame member 6 at the longitudinal position corresponding to the recessed portion 15, wherein the inward-side and outward-side closed cross sections 6*sa*, 6*sb* are configured to branch off from the closed cross section 6*s* of the frame member 6 inwardly and outwardly in the vehicle width direction relative to the damper D (see FIG. 5), wherein the ridgeline 17 which extends in the vehicle longitudinal direction is formed at least at the portion of the frame member 6 which is positioned in front of the recessed portion 15 (see FIGS. 2, 3, 6 and 7).

According to this structure, the recessed-portion corresponding position P, in the vehicle longitudinal direction, of the frame member 6 is constituted as the branch portion of the closed cross section 6*s* of the frame member 6 (the inward-side and outward-side closed cross sections 6*sa*, 6*sb* by providing the recessed portion 15 at the frame member 6. Herein, since the recessed-portion corresponding position P (the branch portion of the closed cross section 6*s*) has the smaller sectional area than the other part of the frame member where the recessed portion 15 is not formed and therefore becomes fragile (weak), there is a concern that in a case where an obstacle collides with the rear portion of the vehicle (in the vehicle rear collision), the collision-load path becomes so narrow at the recessed-portion corresponding position P of the frame member 6 that collision-load concertation may happen at this position P improperly. However, by forming the ridgeline 17 at the portion of the frame member 6 which is positioned in front of the recessed portion 15 as described above, the rear-collision load can be smoothly transmitted forwardly from the recessed-portion corresponding position P along the ridgeline 17 (see the load path L2 in FIG. 2).

Accordingly, the rigidity of the frame member 6 can be increased properly even at the recessed-portion corresponding position P where the recessed portion 15 as the damper support portion is provided.

In the embodiment of the present invention, the ridgeline 17 is formed such that the step portion 18 where the outward-side portion, in the vehicle width direction, of the lower face of the frame member 6 is located at the higher level than the inward-side portion, in the vehicle width direction, of the lower face of the frame member 6 (the lower face of the downward protrusion portion 19) is provided at the corner portion of the outward-side lower portion of the frame member 6 (see FIGS. 2, 3 and 6). Herein, the breather pipe 5b is provided in the space 18s which is formed by the step portion 18 (see FIGS. 2 and 6).

According to this structure, the layout performance (arranging performance) of the breather pipe 5b can be improved by using the step portion 18 which is provided by forming the ridgeline 17.

Specifically, the step portion 18, i.e., the space 18a is formed by the ridgeline 17 on the outward side, in the vehicle width direction, pf the frame member 6 (see FIG. 6).

Accordingly, since the pipe insertion portion 19a is formed at the downward protrusion portion 19 positioned at the inward side, in the vehicle width direction, of the frame member 6, the breather pipe 5b inserted into the piper insertion portion 19a can be made to extend to the space 18s positioned at the outward side, in the vehicle width direction, of the frame member 6 and be arranged in this space 18s.

That is, the breather pipe 5b can be arranged without interfering with the wheel house inner 7a positioned on the outward side, in the vehicle width direction, of the frame member 6 (see FIG. 2).

Accordingly, the layout performance (arranging performance) of the extension portion of the breather pipe 5b which extends outwardly in the vehicle width direction relative to the frame member 6 can be improved by the space 18s formed by the step portion 18.

In the embodiment of the present invention, the ridgeline 17 extends forwardly from the front lower end of the recessed portion 15 of the frame member 6 (from the front end of the lower opening of the recessed portion 15), specifically from the rear-end corresponding portion 63g (see FIG. 8) (see FIGS. 2, 3 and 7).

According to this structure, compared to a case where the ridgeline 17 extends forwardly from a position which is spaced forwardly apart from the front lower end of the recessed portion 15, for example, the rear-collision load can be efficiently transmitted forwardly from the recessed-portion corresponding position P, in the vehicle longitudinal direction, of the frame member 6 (the branch portion of the closed cross section 6s) in the vehicle rear collision.

Moreover, according to this embodiment, since the step face 18a (see FIGS. 3 and 6) is formed at the front lower end of the recessed portion 15 by forming the ridgeline 17 at the front lower end of the recessed portion 15 of the frame member 6, the rigidity of a position of the frame member 6 which corresponds to the front lower end of the recessed portion 15 in the vehicle longitudinal direction can be increased as well. Accordingly, the damper support rigidity (bending rigidity) of the recessed portion 15 as the damper support portion can be increased.

In the embodiment of the present invention, the front portion of the ridgeline 17 extends forwardly and outwardly in the vehicle width direction, and the front end of the ridgeline 17 joins the outward edge portion 6o, in the vehicle width direction, of the frame member 6 (see FIG. 2).

According to this structure, since the front portion of the ridgeline 17 joins the outward edge portion 6o, in the vehicle width direction, of the frame member 6, there is no need of making the ridgeline 17 unnecessarily long, and also the rear-collision load can be efficiently transmitted forwardly by using the outward edge portion 6o, in the vehicle width direction, of the frame member 6 which is continuous from the front end of the ridgeline 17.

The present invention is not limited to the above-described embodiment only, but applicable in various manners. For example, as further another embodiment, as shown by an imaginary line in FIG. 5, an inward-side reinforcing panel 63i to reinforce the frame-lower inward-side middle member 63 may be provided in the inward-side closed cross section 6sa. Likewise, an outward-side reinforcing panel 64i to reinforce the frame-lower outward-side middle member 64 may be provided in the outward-side closed cross section 6sb.

Herein, according to the embodiments descried above, the recessed portion 15 is formed by different members of the floor-lower middle member 62m (63, 64) which corresponds to the side face portion thereof and the top-plate member 65 which correspond to the damper support portion 15 (see FIGS. 5, 7 and 8), so that these members 62m, 65 can be configured to have different plate-thicknesses which respectively correspond to the required damper-support strength. Specifically, in the embodiments described above, since the damper support portion 15 can be configured to have the thinner plate thickness than the side face portion by providing the reinforcing members 30, 30A at the upper portion of the frame member 6, the weight of the recessed portion 15 can be properly light as a whole even if the inward-side reinforcing panel 63i and the outward-side reinforcing panel 64i are provided as described above.

What is claimed is:

1. A rear vehicle-body structure, comprising:
 a frame member provided at a rear portion of a vehicle body and having a closed cross section extending in a vehicle longitudinal direction;
 a recessed portion formed at the frame member, wherein the recessed portion is configured such that a central part, in a vehicle width direction, of a lower face of the frame member is recessed upwardly, and a damper of a rear suspension is inserted into and fixed to the recessed portion; and
 inward-side and outward-side closed cross sections formed inside the frame member at a longitudinal position corresponding to the recessed portion, wherein the inward-side and outward-side closed cross sections are configured to branch off from the closed cross section of the frame member inwardly and outwardly in the vehicle width direction relative to the damper,
 wherein a ridgeline which extends in the vehicle longitudinal direction is formed at least at a portion of said frame member which is positioned in front of said recessed portion.

2. The rear vehicle-body structure of claim 1, wherein said ridgeline is formed such that a step portion where an outward-side portion, in the vehicle width direction, of the lower face of said frame member is located at a higher level than an inward-side portion, in the vehicle width direction, of the lower face of the frame member is provided at a corner portion of an outward-side lower portion of the frame member, and at least one of a fuel pipe and a breather pipe is provided in a space which is formed by said step portion.

3. The rear vehicle-body structure of claim 1, wherein said ridgeline extends forwardly from a front lower end of said recessed portion of the frame member.

4. The rear vehicle-body structure of claim 2, wherein said ridgeline extends forwardly from a front lower end of said recessed portion of the frame member.

5. The rear vehicle-body structure of claim 3, wherein a front portion of said ridgeline extends forwardly and outwardly in the vehicle width direction, and a front end of the ridgeline joins an outward edge portion, in the vehicle width direction, of said frame member.

6. The rear vehicle-body structure of claim 4, wherein a front portion of said ridgeline extends forwardly and outwardly in the vehicle width direction, and a front end of the ridgeline joins an outward edge portion, in the vehicle width direction, of said frame member.

* * * * *